M. T. WRIGHT.
PEANUT PLANTING ATTACHMENT.
APPLICATION FILED JULY 25, 1916.
1,269,357.
Patented June 11, 1918.
3 SHEETS—SHEET 1.
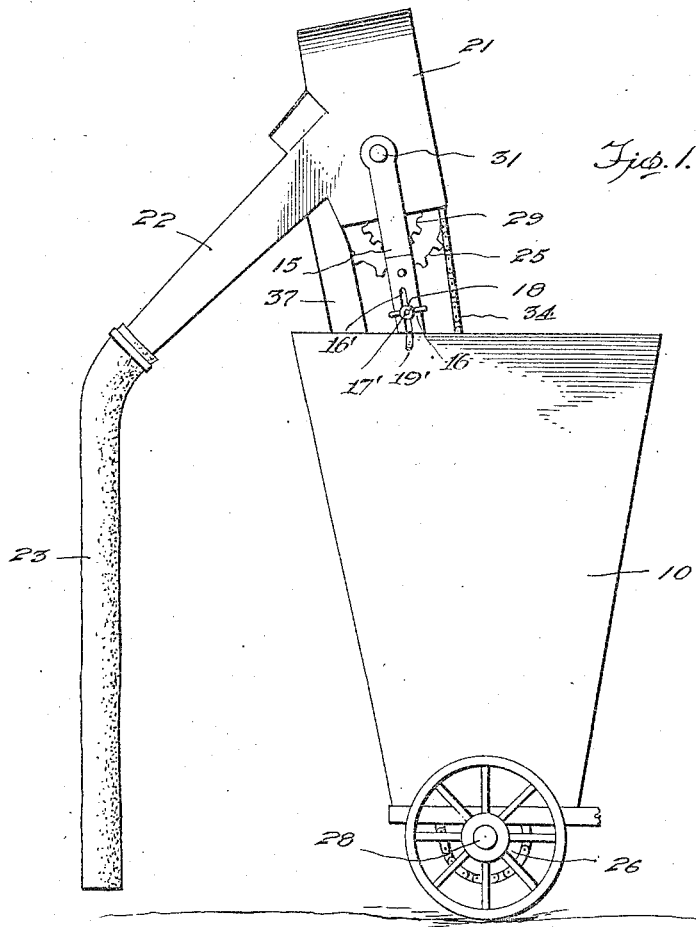
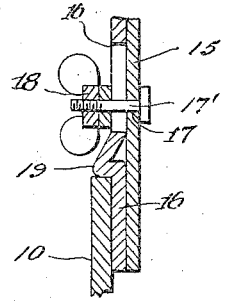
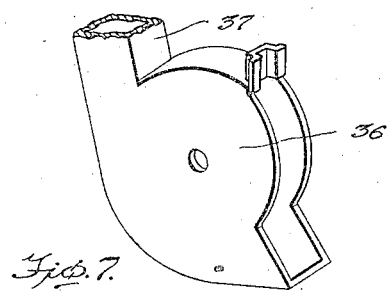
Inventor
M. T. Wright.
By John Louis Waters & Co.
Attorney
Witness
Paul M. Hunt
M. Roberts

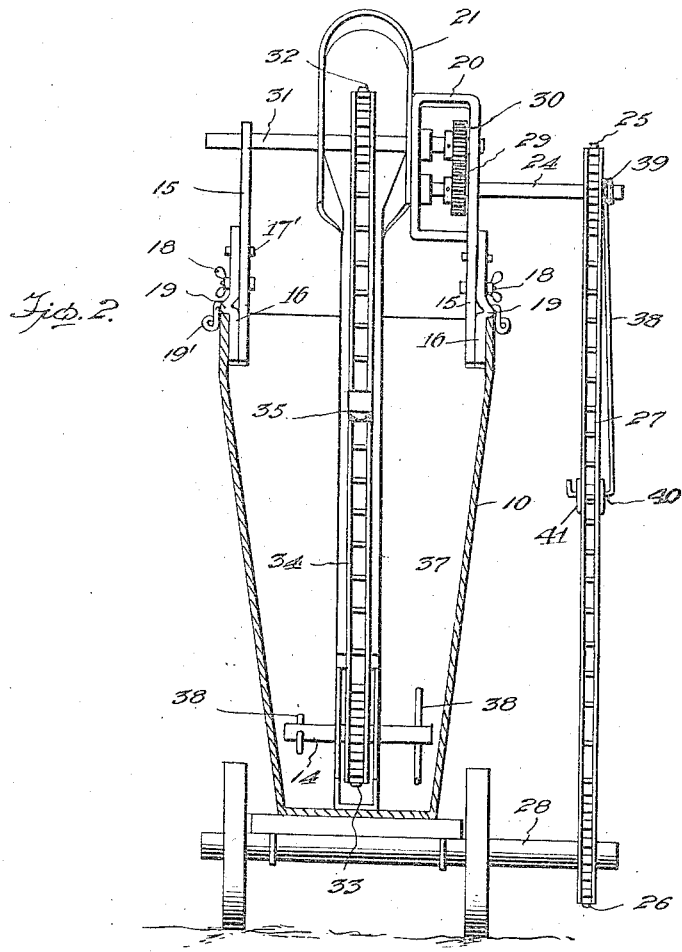
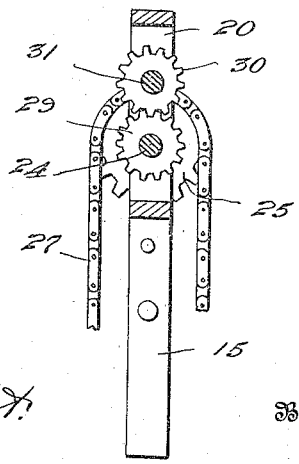
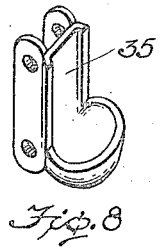

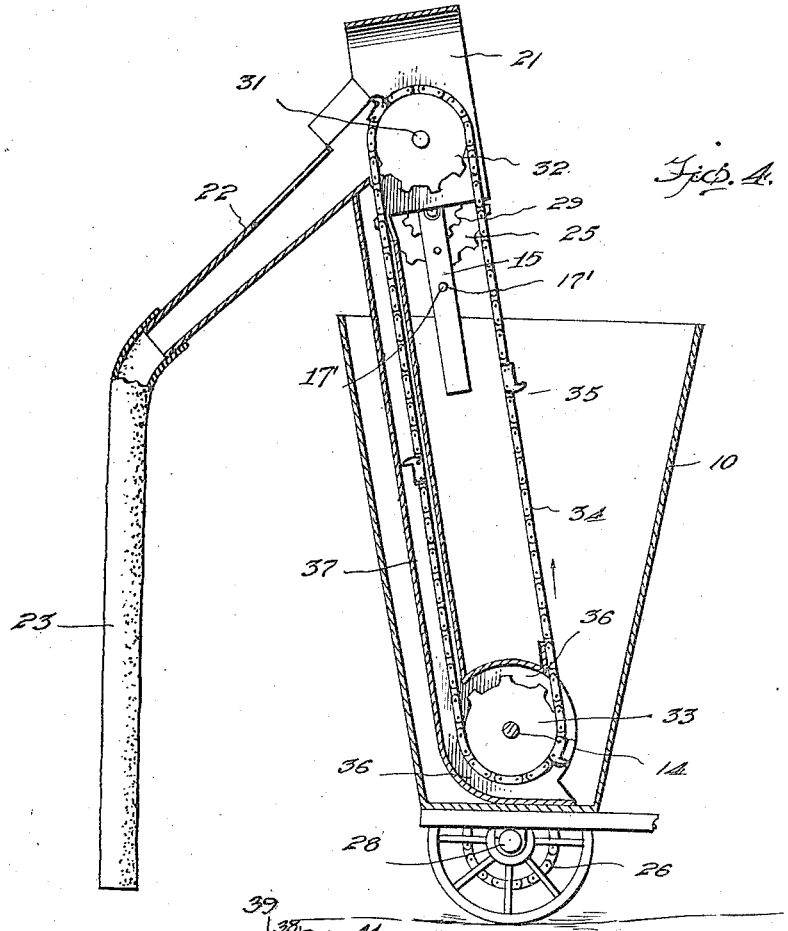
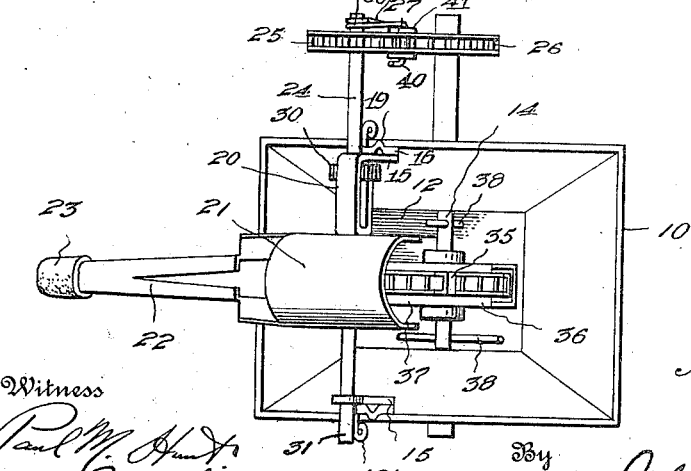

UNITED STATES PATENT OFFICE.

MELVIN T. WRIGHT, OF BOYD, TEXAS.

PEANUT-PLANTING ATTACHMENT.

1,269,357. Specification of Letters Patent. Patented June 11, 1918.

Application filed July 25, 1916. Serial No. 111,200.

*To all whom it may concern:*

Be it known that I, MELVIN T. WRIGHT, a citizen of the United States, residing at Boyd, in the county of Wise and State of Texas, have invented certain useful Improvements in Peanut-Planting Attachments, of which the following is a specification, reference being had therein to the accompanying drawing.

This invention relates to improvements in peanut planting attachments, one object of the invention being the provision of an attachment of this character which may be connected to a corn or cotton planter and by means of which peanuts may be planted at any desired distance apart.

A further object of this invention is the provision of a simple, durable and inexpensive device of this character which may be readily connected or disconnected from a corn planter and which is thoroughly efficient and practical in use.

In the accompanying drawings:—

Figure 1 is a side elevation of the hopper portion of a corn planter with the present invention applied.

Fig. 2 is a sectional view through the hopper taken from the front of the attachment.

Fig. 3 is a top plan view of the hopper with the attachment.

Fig. 4 is a side elevation and partial section of the attachment as mounted in a hopper.

Figs. 5, 6, 7, and 8 are detail views.

Referring to the drawings, the numeral 10 designates the hopper of a corn or cotton planter, the same being indicative of any form or construction of such planters.

The present attachment 11 comprises the inclined casing 37, the lower end 36 of which has journaled therein the shaft 14. Vertically adjustable sectional arms are now provided and consist of sections 15 and 16, the upper sections being provided in their upper ends with openings while the lower ends are provided with small openings 17. Bolts 17' engage the openings 17 and operate in the slots 16' in the section 16, in turn being engaged by winged nuts 18 which serve to hold the sections in a relatively adjusted position. Lugs 19 are formed transversely of the lower sections and rest on the upper edge of the hopper 10, said lower sections being held substantially rigid with the hopper by means of the clamps 19'. Obviously, the lugs and clamps coöperate to prevent exterior movement of the arms for a purpose that will presently appear.

The extreme upper end of one of the sections 15 is provided with the open frame 20 and has attached thereto the hook 21 which is provided with the directing spout 22 having attached thereto the flexible spout 23.

Journaled in the frame 20 is a short shaft 24 which carries the sprocket 25 which is rotated through the sprocket 26 and the chain 27 from the drive shaft 28 of the planter.

This shaft 24 is further provided with a gear 29 which meshes with the gear 30 upon the shaft 31 which projects through the hood 21 and is journaled in the openings in the upper end of the upper sections 15.

Fast to the shaft 31 is a sprocket 32, while fast to the shaft 14 is a sprocket 33, a chain 34 being trained around said sprockets, and carrying detachably thereon the peanut conveyers or cups 35.

The casing 36 substantially surrounds the sprocket 33 and the rear lay of the chain 34 which passes down through the extension 37 of the casing.

Thus as the chain is caused to move in the direction of the arrow, as indicated in Fig. 4, the peanuts are picked up one at a time from the bulk in the hopper 10, and are carried to the hood 21 to be dumped into the upper end of the spout 22. As the conveyers 35 are detachably connected to the chain 34, it is apparent that the peanuts may be distributed or planted at varying distances.

Carried upon and rotatable with the shaft 14 are two pairs of arms 38 which act as agitators to stir the peanuts within the hopper 10 during the rotation of the shaft 14 and the planting operation.

With a view toward providing suitable means for taking up the slack in the chain 27 during the adjustment of the sections 15 and 16 which consequently correspondingly adjust the shaft 24, spreader arms 38 are provided. These arms are preferably formed from resilient wire the intermediate portion of which wire is coiled as at 39 and arranged about the outer end of the shaft 24 so that the tension of the arms is such that they normally move away from each other. The outer end of each arm is bent at right angles and constitutes the journaling portion 40 and about each journaling portion is mounted an idler 41. These idlers yieldingly engage the inner portions of the chain 27 and normally exert a yielding pressure thereon to extend the lays of the chains in opposite directions, thereby taking up the slack when the shaft 24 is adjusted in a low position or nearer to the drive shaft 28. Of course, when the shaft 24 is moved into a raised position the lays will cause the spring arms to contract.

From the foregoing description, it is evident with a device of this character that the complete attachment can be readily placed within the hopper of a corn or cotton planter to be operably connected to the drive shaft thereof, and that by reason of the fact that various adjustments are provided for, the chain may be tightened by the adjustment device 18, while the conveyers 35 may be moved nearer or farther apart, according to the distance it is desired to drop the peanuts.

What I claim as new is:—

1. A peanut planter attachment including a conveyer casing, a directing spout leading from the upper end thereof, shafts journaled in the upper and lower ends of the casing and having their respective ends projecting beyond the sides of the casing, sprocket wheels carried by the shafts and positioned within the casing, a conveyer chain operating about the sprocket wheels and having the rear lay passing through the casing, sectional arms, the upper sections being provided with openings for journaling the outer ends of the upper shaft, the inner ends of the upper sections being provided with small openings, the upper ends of the lower sections being provided with slots, bolts engaged in the small openings and in the slots, means for engaging the bolts to clamp the sections in relatively adjusted positions, lugs projecting from the outer faces of the lower sections beneath the slats and adapted for engagement with a suitable support, clamps carried by the lower section for coöperating with the lugs in holding the lower sections in position on a main support, and means for rotating the upper shaft.

2. A peanut planter attachment including a conveyer casing, a directing spout leading from the upper end thereof, shafts journaled in the upper and lower ends of the casing and having their respective ends projecting beyond the sides of the casing, sprocket wheels carried by the shafts and positioned within the casing, a conveyer chain operating about the sprocket wheels, sectional arms, the upper sections of the arms having openings therein for journaling and supporting the upper shaft, means for removably holding the sections of the arms in various positions of vertical adjustment, lugs formed on the outer faces of the lower sections and adapted for engagement with a suitable support, clamping means operably connected to the lower arms for coöperating with the lugs for facilitating the mounting of the attachment in a rigid position on a support, a frame carried by the upper section of one of the arms, the upper shaft being also journaled in the frame, a gear carried by the upper shaft, another shaft journaled in the frame and projecting outwardly therefrom, a gear carried by the last shaft and meshing with the gear on the upper shaft, a sprocket wheel carried by the last shaft, a chain operating about the last mentioned sprocket wheel and about a suitable source of power, resilient spreader arms operably connected to the last mentioned shaft, and idlers rotatable on the outer ends of the spreader arms and normally held in yielding engagement with the transmitting chain by the spreader arms so as to take up the slack in the chain during the adjustment of the casing.

In testimony whereof I affix my signature.

MELVIN T. WRIGHT.

Copies of this patent may be obtained for five cents each, by addressing the "Commissioner of Patents, Washington, D. C."